No. 607,009. Patented July 12, 1898.
J. J. BAUSCH.
LENS CUTTING MACHINE.
(Application filed Dec. 9, 1897.)
(No Model.) 3 Sheets—Sheet 1.
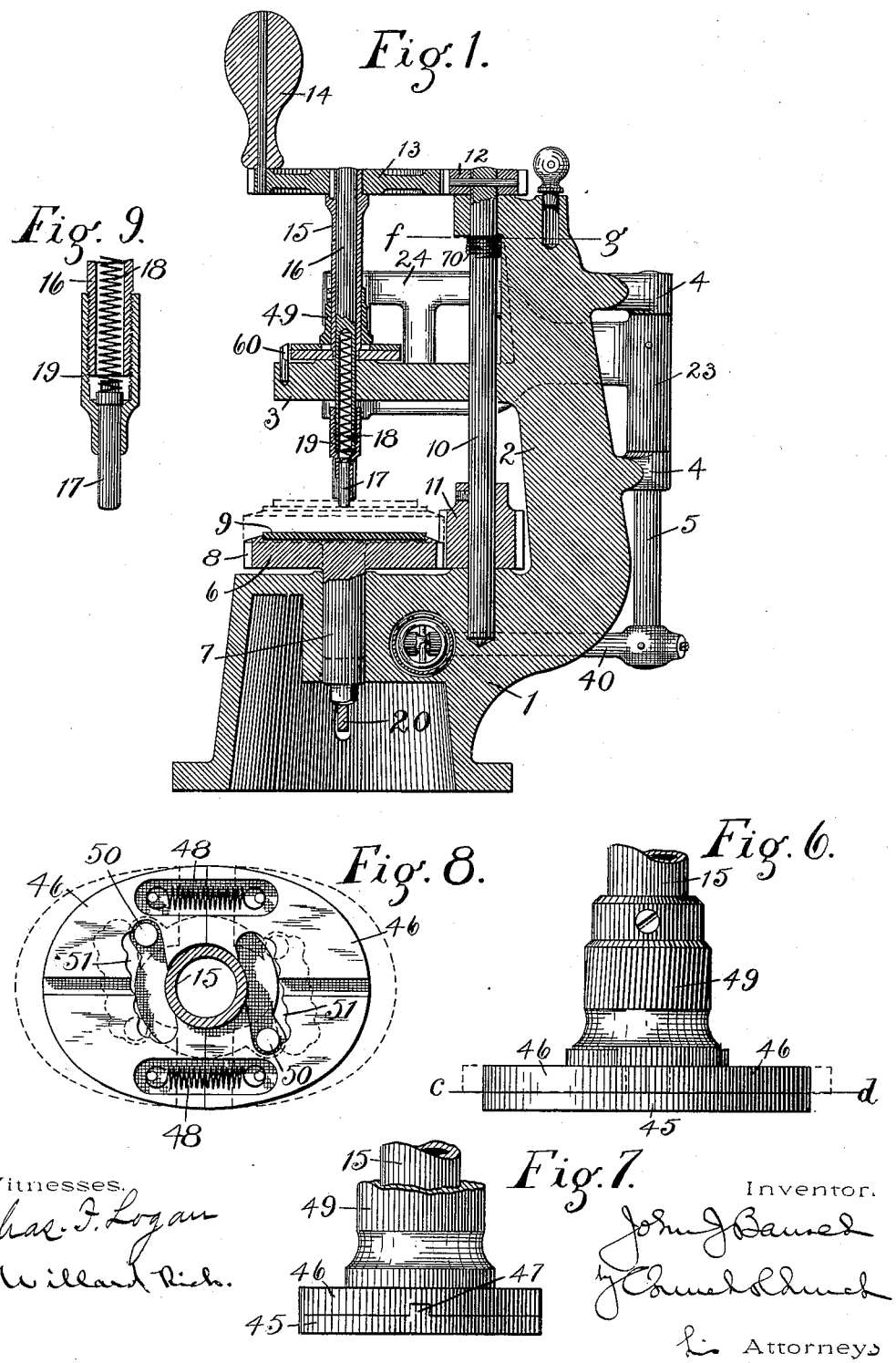

No. 607,009. Patented July 12, 1898.
J. J. BAUSCH.
LENS CUTTING MACHINE.
(Application filed Dec. 9, 1897.)
(No Model.) 3 Sheets—Sheet 2.
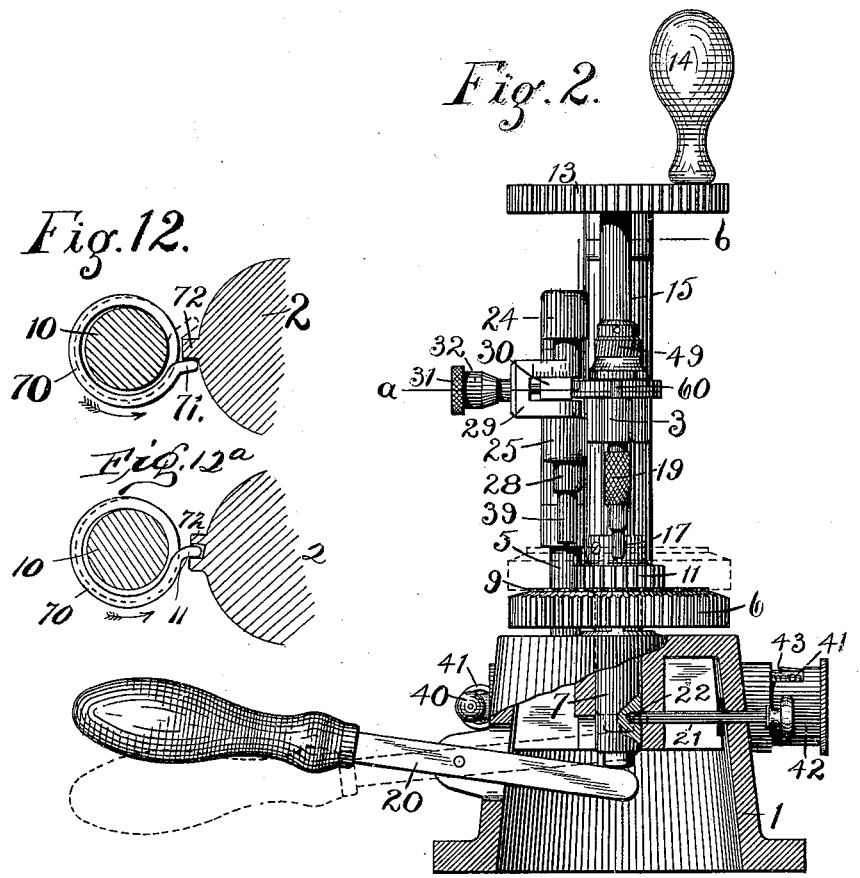
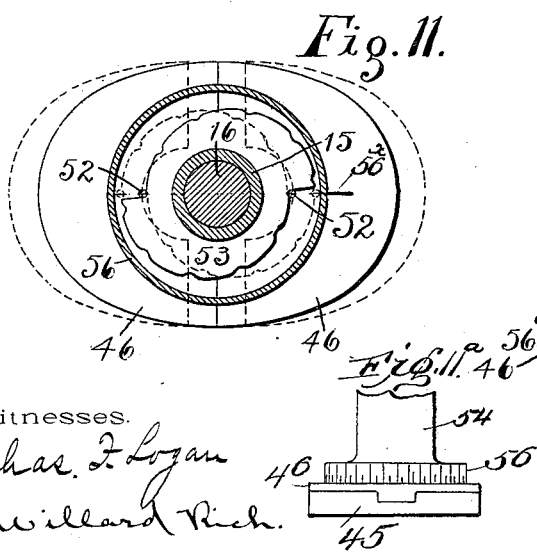
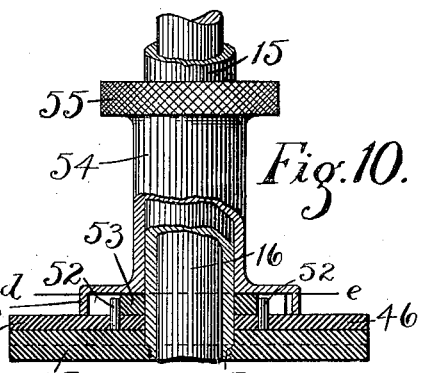
Witnesses.
Chas. F. Logan
G. Willard Rich.
Inventor.
John J. Bausch
Attorneys No. 607,009. Patented July 12, 1898.
J. J. BAUSCH.
LENS CUTTING MACHINE.
(Application filed Dec. 9, 1897.)
(No Model.) 3 Sheets—Sheet 3.
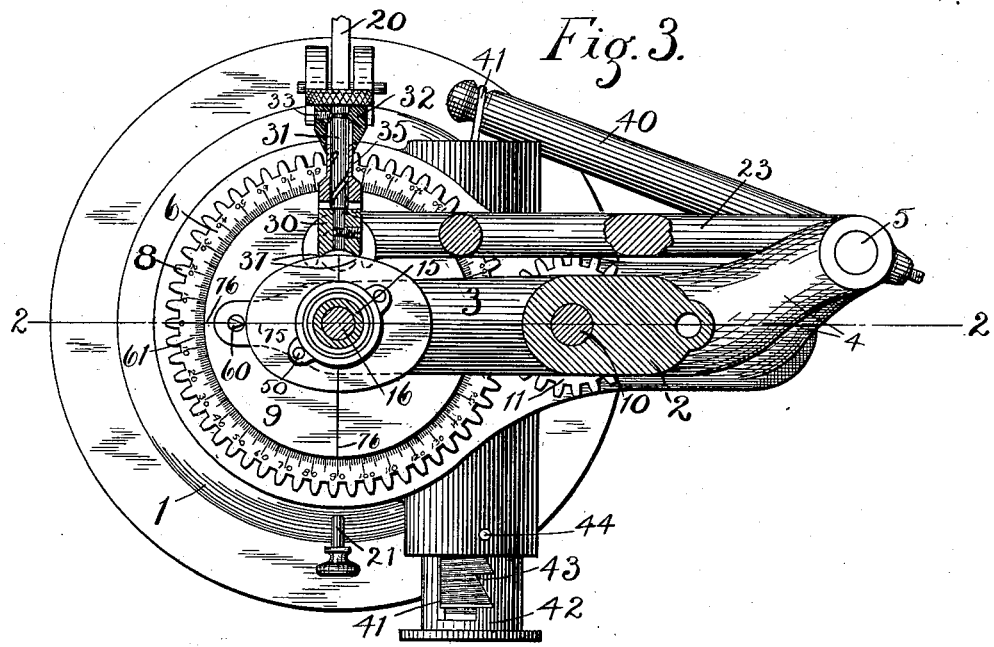
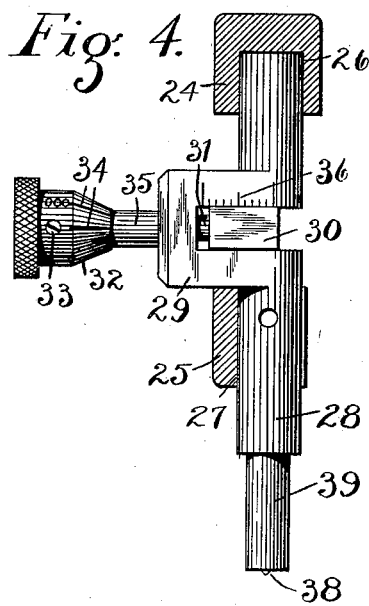
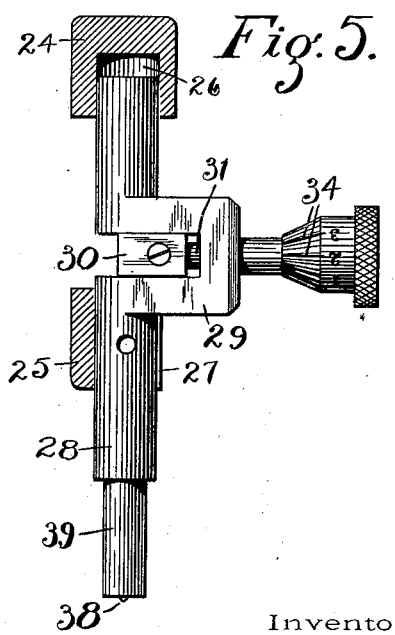
Witnesses.
Chas. F. Logan.
G. Willard Rich.
Inventor.
John J. Bausch
Attorneys

UNITED STATES PATENT OFFICE.

JOHN J. BAUSCH, OF ROCHESTER, NEW YORK, ASSIGNOR TO THE BAUSCH & LOMB OPTICAL COMPANY, OF SAME PLACE.

LENS-CUTTING MACHINE.

SPECIFICATION forming part of Letters Patent No. 607,009, dated July 12, 1898.

Application filed December 9, 1897. Serial No. 661,292. (No model.)

*To all whom it may concern:*

Be it known that I, JOHN J. BAUSCH, of Rochester, in the county of Monroe and State of New York, have invented certain new and useful Improvements in Lens-Cutting Machines; and I do hereby declare the following to be a full, clear, and exact description of the same, reference being had to the accompanying drawings, forming a part of this specification, and to the reference-numerals marked thereon.

My present invention has for its object to provide a machine for describing upon suitable material marks or lines corresponding to a pattern, and is particularly adapted for cutting out the lenses for eyeglasses and spectacles, although capable of being used for other purposes; and to these ends it consists of the apparatus hereinafter described, which is found in practice to be simple, cheap, and capable of operation by an unskilled person.

In the accompanying drawings, Figure 1 is a vertical sectional view of a machine constructed in accordance with my invention; Fig. 2, an end elevation of the same; Fig. 3, a sectional view on the line $a\,b$ of Fig. 2; Figs. 4 and 5, side elevations of the tool-holder, showing in section its supporting-arm and also the manner of removing it; Fig. 6, a side elevation of an adjustable pattern; Fig. 7, an end view of the same; Fig. 8, a sectional view on the line $c\,d$ of Fig. 6, looking upward; Fig. 9, an enlarged sectional view of the work-holder or presser-foot; Fig. 10, a view of another form of an adjustable pattern; Fig. 11, a sectional view of the same on the line $d\,e$; Fig. 11$^a$, an end view of the adjustable pattern-cam shown in Figs. 10 and 11; Fig. 12, a sectional view on the line $f\,g$ of Fig. 1, showing the device for preventing backward rotation of the operating-shaft; Fig. 12$^a$, a view of a modification of the clutch device shown in Fig. 12.

Similar reference-numerals indicate similar parts.

The main frame of the machine (indicated by 1) is provided with a standard 2 and with a forwardly-projecting arm 3 and also with rearwardly and laterally extending arms 4 4, constituting bearings for a vertical arbor 5, to which the tool-carrying device is secured, as will be presently described.

Upon the base 1 and below the arm 3 is arranged a rotary work-support 6, provided with a downwardly-extending pintle 7, journaled in the base and capable of a vertical movement, said support having at its periphery gear-teeth 8, by which it may be rotated with the pintle as a center. The upper surface of the work-support is preferably recessed somewhat and adapted to receive a pad 9, of leather or other slightly-yielding material, upon which a piece of glass may be held by friction and rotated with the work-support.

10 indicates a vertical shaft journaled in the main frame and having an elongated pinion 11, meshing with the gear-teeth 8 on the work-support, said shaft having at its upper end a pinion 12, meshing with a gear 13, mounted upon a pattern-carrying sleeve 15, arranged above the work-support and rotating loosely upon a spindle 16, secured to the arm 3 of the main frame. An operating crank-handle 14 is secured to the gear 13 for rotating the sleeve and support. The spindle 16 is hollow and at its lower end is provided with a work-holder or presser 17, moved downwardly by a spring 18 and confined and guided in the end of the spindle by a cap 19, screwing thereon, this arrangement enabling me to adjust the height of the holder for different thicknesses of material, as shown particularly in Fig. 9.

The work-support 6 is adapted to be raised by means of the lever 20, pivoted in the base and engaging the end of the pintle 7, so that the work thereon will be brought in contact with the work-support 17, the elongated pinion 11 permitting this without disengagement, and when desired the support may be locked from rotation by a movable pin 21, extending through the base and entering a suitable recess 22, formed in the pintle 7.

The arbor 5, supported in the arms 4 of the main frame, is rigidly attached to an oscillating support or frame 23, extending over the work-support 6 at one side of the arm 3, and said frame carries at its outer end a tool or marking device coöperating with the pattern and operating upon the work on the work-support, said frame preferably embodying two arms 24 and 25, the former having a socket 26 therein and the latter an open-sided recess 27, as shown in Figs. 3 to 5, adapted to receive a tool-holder 28. The holder is provided with the circular portions operating in the sockets 26 and 27 and with the laterally-extending portion 29 resting upon the upper side of the arm 25 when the holder is locked in position; but when it is desired to remove it from the frame said holder may be turned to the position shown in Fig. 5, the portion 29 passing off the arm 25 and then moved downward, the end being withdrawn from the upper socket 26.

30 indicates a block or shoe movable in a suitable slot or recess in the holder 28 and adapted to contact with the edge of a suitable pattern arranged upon the pattern-carrying sleeve 15, said block having swiveled to it a steep-pitched screw 31, having at its outer end an operating thumb-nut 32, adjustably connected by a small screw 33 with the adjusting-screw 31, and a suitable micrometer-index 34 on the thumb-nut 32 is arranged to coöperate with suitable indicia upon the sleeve 35, formed upon or connected to the tool-carrier 28, whereby the thumb-nut and screw may be adjusted relatively for accomplishing fine adjustments of the block 30 on the carrier, and the coarse adjustment of said block 30 relative the tool-holder 28 may be regulated by a suitable scale 36, with which the edge of said block coöperates, as shown in Fig. 4.

As the present construction of the machine is particularly adapted for cutting or marking approximately elliptical forms and as the pattern must be of substantially the shape desired, I prefer to form the inner edges of the block 30 with two bearing-points, (indicated at 37 in Fig. 3,) located on opposite sides of the pivotal center of the holder, to cause the proper operations of the tool relative to the center of rotation of the pattern and also that the tool-holder 28 may be oscillated in its bearings 26 and 27 and the tool maintained in its proper position relative to the line of cut. Unless the two bearing-points or a sufficiently broad bearing between the tool-holder and the pattern are provided the holder will be liable to be turned on its center and the center of the bearing-block might be moved out of line with the center of the pattern—as, for instance, when the block engages the smaller end of the pattern. The tool-holder is held against the pattern by a spiral spring 41, connected at one end to an arm 40 on the arbor 5 and passing through and connected to a sleeve 42, adjustable in the base of the machine and secured in adjusted position by means of teeth or serrations 43 on the sleeve engaging a pin 44. The teeth on the sleeve and the spring are so arranged that the torsion of the latter will tend to keep the teeth engaged, so that the adjustment may be effected by rotating the sleeve and moving it inward or outward. This arrangement provides an adjustable spring of sufficient length to yield easily and strong enough to keep the tool-carrying arm against the pattern, operating through the arm 40, arbor 5, and frame 23, as will be understood.

From the above it will be seen that if the work or article to be marked is placed upon the support 6 and the latter is raised to the position shown in dotted lines in Fig. 1 and the pattern-sleeve rotated by means of the handle 14 the work will be held by the presser 17 and rotated simultaneously with the pattern and that the tool mounted upon the holder 28 will follow the configuration of the pattern, marking the work to correspond with it.

As the machine is particularly adapted for cutting lenses for eyeglasses and spectacles, the tool I prefer to employ is a diamond 38, mounted in the end of a stock 39, attached to the tool-holder 28, and the pattern is of approximately elliptical form, as shown, for instance, in full lines in Fig. 8.

The sleeve 15 and its connected gear being readily removable by lifting it from the spindle 16, various sizes and shapes of patterns could be employed, if desired, either by making the pattern removable from the sleeve or else employing a number of sleeves and gears with patterns rigidly attached. I prefer, however, to employ an adjustable pattern, which, in connection with the adjustable block 30 on the tool-holder, enables me to form lenses varying somewhat in shape. In the present embodiment I have shown in Figs. 6, 7, and 8 and 10 and 11 two forms of adjustable patterns, both of which, however, embody the lower plate 45, adapted to rest upon the arm 3 of the main frame and secured rigidly to the sleeve 15, said plate being approximately elliptical in form and having upon it movable plates or pattern-sections 46, guided by suitable ribs 47 and corresponding recesses to move in the direction of the major axis of the ellipse and connected by extensible springs 48. The pattern-plates 46 may be adjusted outwardly and held in adjusted position by any suitable means, and in Fig. 8 I have shown one form of adjusting device consisting of a sleeve 49, mounted upon the sleeve 15 and having at its lower ends pins 50, adapted to coöperate with cam-slots 51, formed in the plates 46, the outer edge of said slots being notched or serrated, as shown, so that as the plates 46 are drawn together by their connecting-springs the parts will be held from accidental movement. In Figs. 10 and 11 I have shown a preferred form of device for adjusting the plates 46, in which said plates are provided in their upper sides with pins 52, held by the springs 48 (shown in the other forms of pattern) against notched cams 53, secured to an operating-sleeve 54, having a milled edge 55 and also a flange 56, extending downward and covering the cams and pins, said flange having a graduated scale thereon with which coöperates an index or mark 56× on the pattern, as shown particularly in Figs. 11 and 11ª.

In using the machine in the manner above described not only may the tool be caused to cut an ellipse of the shape of the pattern 45, (or of the adjustable plates 46 when moved outward,) but the size and shape of the ellipse may be modified as desired, the size being varied from the normal or that of the plate 45 by the adjustment of the block 30 on the tool-holder and the shape by the adjustment of the pattern, varying its longitudinal axis only, and by the combined adjustments of the block 30 on the tool-holder and the pattern the variations can be considerably multiplied.

In cutting lenses for cylindrically-ground glasses it is necessary in some cases that the axis of the cylinder bear a certain relation to the major axis of the ellipse, and in order that the proper adjustment may be accomplished I arrange an index 60 upon the arm 3, adapted to coöperate with a mark 75 upon the major axis of the pattern and mark upon the edge of the work-support 6 a scale 61, divided into degrees. The pad 9 on the work-support is detachable and adjustable and has upon it two marks 76, crossing at the center of the support at right angles, and one of these marks 76 normally coincides with the zero-point on the degree-scale on the support.

The machine is set for normal operation by adjusting the work-support until the zero-point of the scale is toward the front, and the locking-pin 21 is thrust inward to hold it. Then the pattern is adjusted until the mark 75 thereon coöperates with the index 60, and in this position the major axis of the pattern and the zero-point on the work-support scale are in line, the mark 76 coinciding with the zero. If now it is desired to cut a cylindrically-ground lens with the cylinder-axis at, say, thirty degrees from the major axis of the ellipse, it is only necessary to remove the pad 9 and turn it until the mark 76 is at the thirty-degrees mark on the scale 61 and place the lens-blank on the pad with the axis of the cylinder in line with the mark 76, then release the pin 21, move the work-support upward until the presser-foot engages and holds it to the support, and rotate the support and pattern, when the diamond, accurately following the pattern, will cut the glass in a manner well understood by those skilled in the art.

In cutting glasses with a diamond it is necessary that the diamond and the glass should always move in the same direction relatively, as otherwise the cutting medium will be damaged in a comparatively short time, and in order that the rotation of the glass operated upon should be the same at all times I provide upon one of the shafts, preferably shaft 10, a clutch device for preventing backward rotation, or at least permitting only such a small amount of backward movement as will enable the operator to join the ends of the ellipse, and this stop device is in the form of a spiral coil of wire 70, encircling the shaft and held thereon by friction alone, said coil being provided with a free end 71, adapted to engage with a rib or projection 72 on the standard 2, as shown in Figs. 1 and 12. When the shaft is rotated in the direction indicated by the arrow, Fig. 12, the end 71 of the coil will engage the rib and the coil will be loosened and slide loosely on the shaft; but if the motion be reversed the end of the coil will move around, engage the other side of the rib 72, and become tightened on the shaft, absolutely arresting rotation. In the present embodiment I have allowed some latitude for backward rotation; but it will be understood that if the end 71 of the spring should engage two stops—for instance, the opposite sides of the rib 72—close together the backward rotation would be absolutely prevented, as shown in Fig. 12ª. The clutch device just described is of course applicable to other forms of machinery, and, except as limited in the claims, I do not desire to be confined to its use in connection with a cutting or marking machine such as herein shown.

Instead of a diamond any suitable marking or cutting tool could be employed for marking on other materials than glass, and thus the uses of a machine such as described materially increased.

I claim as my invention—

1. The combination with the main frame, the rotary and vertically-movable work-support, and the arm on the frame extending over the support, the spindle on the arm and extending upwardly therefrom, the sleeve loosely mounted on the spindle, having the pattern thereon, of the laterally-movable tool-holder engaging the edge of the pattern, and means for rotating the pattern and support, substantially as described.

2. The combination with the main frame, the rotary and vertically-movable work-support, and the arm on the frame extending over the support, the vertical spindle on the arm, the sleeve loosely mounted on the spindle having the gear and the pattern thereon, gearing between said pinion and the work-support, and a tool-holder engaging the pattern, substantially as described.

3. The combination with the main frame, the rotary work-support, and the arm on the frame extending over the support, the vertical spindle on the arm, the removable sleeve mounted on the spindle, having the gear and the pattern thereon, of the tool-holder engaging the pattern, the pinion mounted in the frame engaging the gear on the sleeve, and connections between the said pinion and the work-support, substantially as described.

4. The combination with the frame, the rotary work-support and the arm on the frame extending over the support, of the removable pattern mounted on upper side of the arm and the gear connected thereto, the pinion on the frame with which said gear engages, connections between the pinion and the work-support, the tool-holder, and a spring holding it in contact with the pattern.

5. The combination with the frame, the vertically-movable work-support having the gear-teeth, and the elongated pinion, of the supporting-arm on the frame, the pattern removably mounted on the upper side of the arm, the gear connected to the pattern, connections between said gear and the elongated pinion, and the movable tool-holder engaging the pattern, substantially as described.

6. The combination with the frame having the supporting-arm, the rotary and vertically-movable work-support, and the spring-pressed work-holder on the arm, of the removable pattern rotating on the upper side of the arm, and connections between it and the work-support, the tool-holder, and means for holding the latter in engagement with the pattern, substantially as described.

7. The combination with the main frame having the arm, the rotary removable pattern mounted on the upper side of said arm, the rotary work-support beneath the arm having its center coincident with that of the pattern, and connections between the work-support and pattern for causing their simultaneous rotation, of the spring-operated carrier movable substantially radially of the pattern, the tool-holder thereon, and the adjustable block on the tool-holder for engaging the pattern.

8. The combination with the main frame having the arm, the spring-pressed work-holder on the lower side of the arm, the rotary removable pattern mounted on the upper side of said arm, the rotary work-support beneath the arm having its center coincident with that of the pattern and work-holder, and connections between the work-support and pattern for causing their simultaneous rotation, of the spring-operated carrier movable substantially radially of the pattern, the tool-holder thereon, and the adjustable block on the tool-holder for engaging the pattern.

9. The combination with the main frame having the arm thereon, the spring-pressed work-holder on the lower side of the arm, the rotary removable pattern mounted on the upper side of said arm, the rotary work-support beneath the arm having its center coincident with that of the pattern and work-holder, said work-support and arm being relatively movable toward and from each other, and connections between the work-support and pattern for causing their simultaneous rotation, of the spring-operated arm movable substantially radially of the pattern, the tool-holder thereon, and the adjustable block on the tool-holder for engaging the pattern.

10. The combination with the pattern, of a movable support having a socket-bearing and an open bearing thereon, a tool-holder journaled in said bearings, and having a shoulder thereon for preventing longitudinal movement, substantially as described.

11. The combination with the pattern, of a movable support having a socket-bearing and a bearing thereon open toward the pattern, a tool-holder journaled in said bearings, and having a shoulder engaging the support and preventing longitudinal movement in the bearings.

12. The combination with the pattern, of the movable support having the upper and lower arms, the former provided with the socket-bearing, and the latter with the open-sided bearing, of the tool-holder pivoted in said bearings, and having the shoulder for engaging the lower arm and the adjustable block on the holder, substantially as described.

13. The combination with the frame, the rotary work-support, a pad adjustable on the support, and indicia for indicating their relative adjustment, of the rotary pattern, connections between the pattern and work-support for causing their simultaneous rotation, indicia for indicating the relative adjustment of the pattern and work-support, and a tool coöperating with the pattern and operating on the work, substantially as described.

14. The combination with the frame, the rotary work-support, the holding device for the latter, a pad on the work-support, and rotarily adjustable thereon, a scale and index between the pad and support for indicating in degrees their relative adjustment, of a rotary pattern, connections between said pattern and the work-support for rotating them simultaneously, indicia between the pattern and the frame, and a tool engaging the pattern and coöperating with the work, substantially as described.

15. The combination with the frame, the rotary and vertically-movable work-support having the gear-teeth, the arm on the frame extending over the work-support, the sleeve having the gear and the pattern thereon journaled on the arm and vertically removable therefrom, and the shaft in the frame having the pinions thereon, engaging the work-support and pattern-gear, of the swinging frame engaging the pattern and the tool-holder on said frame.

16. The combination with the main frame, the work-support, and the rotary pattern, of the swinging frame, the arbor therefor, the spring connected to the arbor, the rotary and adjustable sleeve to which the spring is connected journaled in the main frame, and projections between the sleeve and main frame for holding the sleeve in adjusted position.

17. The combination with the rotatable pattern embodying two relatively-adjustable sections, of a support movable toward and from the pattern, a tool-holder thereon, and adjusting devices between the tool-holder and pattern, substantially as described.

18. The combination with the rotatable pattern embodying the two relatively-adjustable sections, of the swinging tool-holder, a tool carried thereby, and adjustable connections between the tool and the pattern, whereby the path of the tool may be varied, substantially as described.

19. The combination with the rotatable elliptical pattern embodying the two sections relatively adjustable in the direction of the major axis of the ellipse, of the movable support, the tool-holder pivoted thereon engaging the pattern on opposite sides of the pivotal center of the holder, a tool carried by the holder, and means for adjusting the tool relatively of the pattern.

20. The combination with the rotatable elliptical pattern embodying the two sections adjustable in the direction of the major axis of the ellipse, of the swinging support, the tool-holder pivoted thereon, the block on the holder for engaging the periphery of the pattern, and means for adjusting the block on the holder.

21. A pattern embodying the base-plate having the guides thereon, the pattern-sections movable on the guides, and the springs connecting them, the rotary adjusting-sleeve, and serrated cam-surfaces and coöperating pins between the sleeve and pattern-sections, substantially as described.

22. A pattern embodying the elliptical base-plate having the guides thereon, the semi-elliptical pattern-sections movable on the guides, the spring connecting them, the rotary sleeve having the notched cams, and the pins on the pattern-sections for engaging said cams, substantially as described.

23. In a lens-cutting machine, the combination with the stationary frame, a rotary work-support, and a diamond cutting-tool coöperating therewith, of a rotary shaft connected to the work-support, and an automatic clutch device on the stationary frame and engaging said shaft for preventing its backward rotation.

24. In a machine embodying a rotary work-support and a tool operating relatively thereto in one direction only, a rotary shaft communicating relative motion between said support and tool, and a clutch device for arresting said shaft, consisting of a spiral spring embracing the shaft by its own elasticity having a free end and stationary stops with which said end coöperates to clamp or release the spring from the shaft, substantially as described.

25. In a lens-cutting machine, the combination with a rotary work-support, and a diamond cutting-tool coöperating therewith, of a shaft rotating with the support, a spiral spring embracing said shaft by its own elasticity, and having a free end, and stops with which said end engages to clamp or release the shaft.

JOHN J. BAUSCH.

Witnesses:
F. F. CHURCH,
G. A. RODA.